(12) United States Patent
Acharya et al.

(10) Patent No.: US 7,392,263 B2
(45) Date of Patent: Jun. 24, 2008

(54) FILE SYSTEM REPRESENTED INSIDE A DATABASE

(75) Inventors: Srinivasmurthy P. Acharya, Sammamish, WA (US); Jack S. Richins, Bothell, WA (US); Jason T. Hunter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 11/155,428

(22) Filed: Jun. 17, 2005

(65) Prior Publication Data

US 2006/0195417 A1    Aug. 31, 2006

Related U.S. Application Data

(60) Provisional application No. 60/657,533, filed on Feb. 28, 2005.

(51) Int. Cl.
*G06F 17/00* (2006.01)
(52) U.S. Cl. .................. 707/102; 707/100; 707/101; 707/103 R
(58) Field of Classification Search ............ 707/1, 707/10, 100; 711/100
See application file for complete search history.

(56) References Cited

U.S. PATENT DOCUMENTS

| 5,819,276 A * | 10/1998 | Cai et al. ............... 707/100 |
| 7,167,960 B2 * | 1/2007 | Kodama et al. ......... 711/162 |
| 2005/0044089 A1 | 2/2005 | Wu et al. |
| 2005/0044108 A1 | 2/2005 | Shah et al. |
| 2005/0044187 A1 | 2/2005 | Jhaveri et al. |

OTHER PUBLICATIONS

Tim Sneath, "CLI326: WinFS—File System Integration and Security", Welcome to MSDN Blogs, retrieved from http://blogs.msdn.com/tims/archive/2003/10/29/57428.aspx on Apr. 13, 3006, 4 pages.
European Search Report dated May 2, 2006 for European Patent Application Serial No. EP 06 10 0556, 3 pages.

* cited by examiner

*Primary Examiner*—Sana Al-Hashemi
(74) *Attorney, Agent, or Firm*—Amin, Turocy & Calvin, LLP

(57) ABSTRACT

The subject invention provides a system and/or a method that facilitates adapting at least two disparate file systems. A file system adapter can provide uniformity and/or seamless integration between a first file system and a second file system. The file system adapter can employ a file-backed item that is enriched by a file to provide at least one of a property to an item and a file stream associated with the item. The file-backed item can allow a manipulation by at least one of an API for the first file system and an API for the second file system.

18 Claims, 12 Drawing Sheets

FILE SYSTEM REPRESENTED INSIDE A DATABASE

CROSS-REFERENCE TO RELATED APPLICATION(S)

This application claims the benefit of U.S. Provisional Patent Application Ser. No. 60/657,533, filed on Feb. 28, 2005, entitled "FILE SYSTEM REPRESENTED INSIDE A DATABASE." The entirety of which application is incorporated herein by reference.

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, and a record includes a set of fields. Records are commonly indexed as rows within a table and the record fields are typically indexed as columns, such that a row/column pair of indices can reference a particular datum within a table. For example, a row may store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. The database application allows the user to compare, sort, order, merge, separate and interconnect the data, so that useful information can be generated from the data. Yet, the capacity and versatility of databases have grown to an incredible amount to allow a virtually endless storage capacity utilizing databases. Moreover, typical database systems offer limited query-ability based upon time, file extension, location, and size. For example, in order to search the vast amounts of data associated to a database, a typical search is limited to a file name, a file size, a date of creation, wherein such techniques are deficient and inept.

With a continuing and increasing creation of data from end-users, the problems and difficulties surrounding finding, relating, and storing such data is reaching its peak. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, designing a compact disc label, all require the creation of data.

Not only are the complications surrounding users, developers have similar issues with data. Developers create and write a myriad of applications varying from personal applications to highly developed enterprise applications. While creating and/or developing, developers frequently, if not always, gather data. While obtaining such data, the data needs to be stored. In other words, the problems and difficulties surrounding finding, relating, and storing data jeopardizes both the developer and the end user.

Furthermore, technological advances in databases have led to a multitude of formats and/or configurations. Database formats and/or configurations have increased due, wherein such changes can pose integration difficulties. In other words, disparate file databases typically do not adapt well with each other based on development differences. Therefore, there is a need to overcome the aforementioned exemplary deficiencies associated with conventional systems and databases.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate adapting disparate file systems. A file system adapter can provide uniformity between a first file system and a second file system. The uniformity can allow an application and/or API for the first file system to be implemented in the second file system. The file system adapter can implement a file-backed item, which can be an item relating to the second file system that relies on a file and/or a file stream to populate at least one property associated therewith. The file-backed item can utilize the file and/or associated file stream to populate the item with properties and/or metadata in the second file system. By utilizing the file-backed item, the file system adapter allows manipulation by the API's associated to the second file system as well as existing API's related to current and previous versions of the first file system. The file system adapter can also provide synchronization between the first file system and the second file system. It is to be appreciated and understood that the file-backed item can incorporate the characteristics of the first file system to the second file system such as, but not limited to, an attribute, a security characteristic, the file stream, the file, etc.

In accordance with one aspect of the subject invention, the file system adapter can include an attribute component. The attribute component can provide attributes associated to the file and/or file stream associated with the first file system to the second file system. A file can have at least one attribute such as, but is not limited to, read only, compressed, archived file, etc., wherein a bit and/or bits can represent such attributes. The attribute component can allow the file-backed item that represents a file and/or file stream in the first file system to incorporate such attributes to the second file system.

In accordance with another aspect of the subject invention, the file system adapter can include a metadata handler component that allows at least one property to stay in sync between the item, the file-backed item, and a backing file (e.g., the file in the file system that is represented by the file-backed item). A property can be modified in the backing file stream, wherein the metadata handler component can promote the new value to the appropriate field in the item within the second file system. Furthermore, a property can be changed through an API associated to the second file system; the metadata handler component can demote the new value to the backing file stream within the first file system.

In accordance with still another aspect of the subject invention, the file system adapter can include a ghost component that provides synchronization for a property of the file-backed item. In addition, an attribute tunnel component can be utilized to provide attribute tunneling to facilitate name changing and/or conserving resources within the second file system. Moreover, the file system adapter can include a DAG component that utilizes a directed acyclic graph in conjunction with the subject invention. In other aspects of the subject invention, methods are provided that facilitate adapting disparate file systems.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
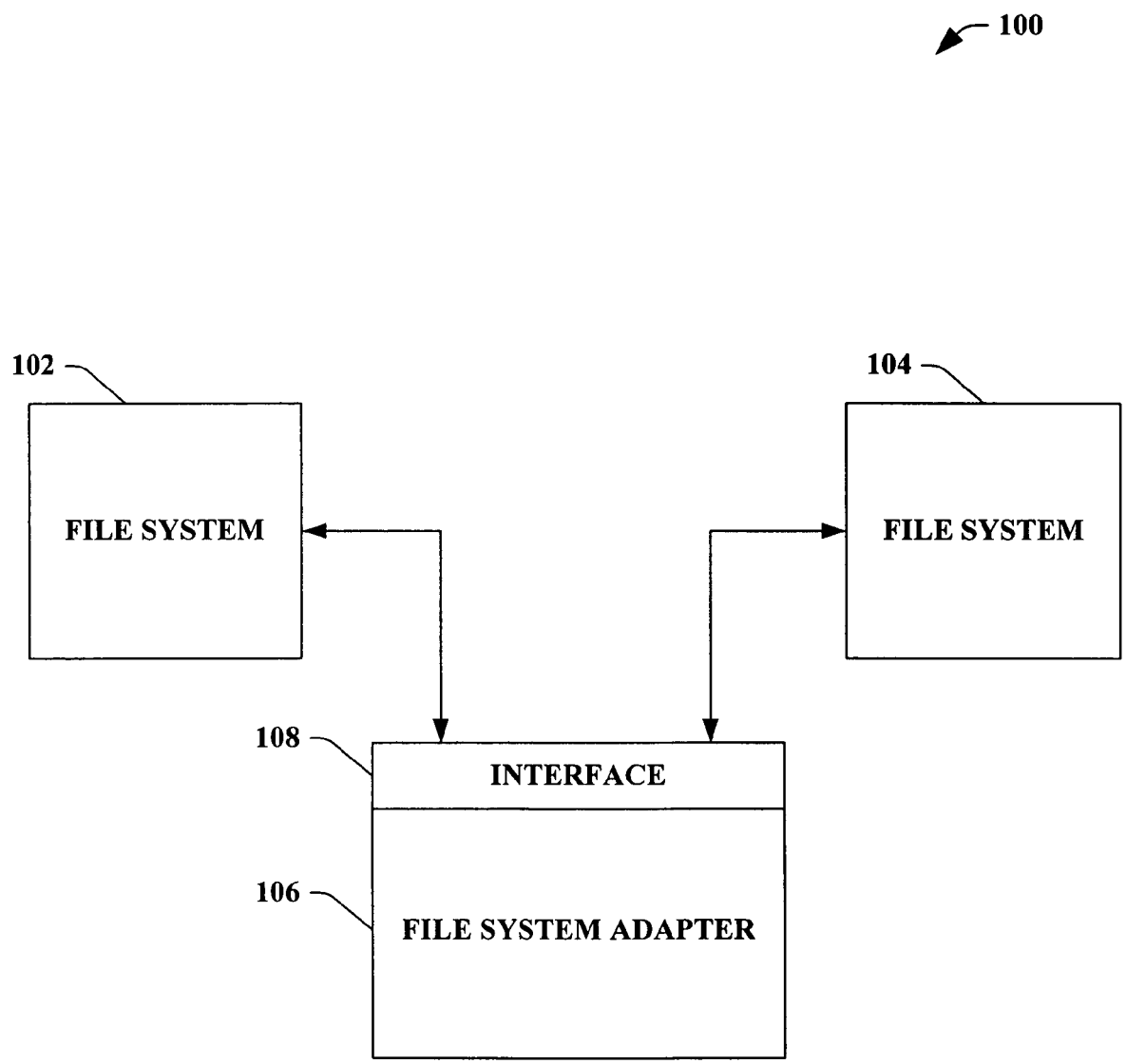
FIG. 1 illustrates a block diagram of an exemplary system that facilitates adapting a file stream associated file system and a metadata associated file system.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates adapting a file system with a disparate file system. A file system 102 can be a file storage system, wherein the structure is based on a file stream and/or a directory. The file system 102 can utilize the file stream such that an application and/or application programming interface (API) can enrich the file stream to provide more structure. A file system 104 can be a more complex model, wherein an item, a sub-item, a property, and a relationship are defined to allow the representation of information within the file system 104 as instances of complex types. An item can be defined as the smallest unit of consistency in the file system 104, which can be independently secured, serialized, synchronized, copied, backup/restored, etc. The item is an instance of a type, wherein all items in the file system 104 can be stored in a single global extent of items. The file system 104 can be based upon at least one item and/or a container structure. The file system 104 can be a storage platform that exposes rich metadata that is buried in files as items. It is to be appreciated that the file system 104 can be a file storage system represented by a data model to support the discussed functionality.

A file system adapter 106 can provide compatibility and/or uniformity between the file system 102 and the file system 104. The compatibility and/or uniformity can allow an application and/or an API for the file system 102 to be implemented in the file system 104. The file system adapter 106 can implement a file-backed item, which can be an item relating to the file system 104 that relies on a file and/or a file stream to populate at least one property associated therewith. The file-backed item can act as a bridge between the file system 102 and the richly schematized file system 104 and/or a data model related therewith. For example, an image item in the file system 104 can be a file-backed item, wherein the image item is backed by a file conforming to a standard image format (e.g., JPEG, TIF, BMP, etc.) of the file system 102. In other words, the file-backed item can utilize the file and/or associated file stream (e.g., utilized by the file system 102) to populate the item with properties and/or metadata in the file system 104. By utilizing the file-backed item, the file system adapter 106 allows manipulation by the API's associated to the file system 104 as well as existing API's related to current and previous versions of the file system 102. The file system adapter 106 can also provide synchronization between the file system 102 and the file system 104. In particular, the file-backed item can provide the data in sync with the corresponding data in the backing file. It is to be appreciated and understood that the file-backed item can provide the characteristics of the file system 102 to the file system 104 such as, but not limited to, an attribute, a security characteristic, the file stream, the file, etc.

The system 100 further includes an interface component 108, which provides various adapters, connectors, channels, communication paths, etc. to integrate the file system adapter 106 into virtually any operating system(s). In addition, the interface component 108 can provide various adapters, connectors, channels, communication paths, etc. that provide for interaction with data and the file system adapter 106. It is to be appreciated that although the interface component 108 is incorporated into the file system adapter 106, such implementation is not so limited. For instance, the interface component 108 can be a stand-alone component to receive or transmit the data in relation to the system 100.

Figure 2:
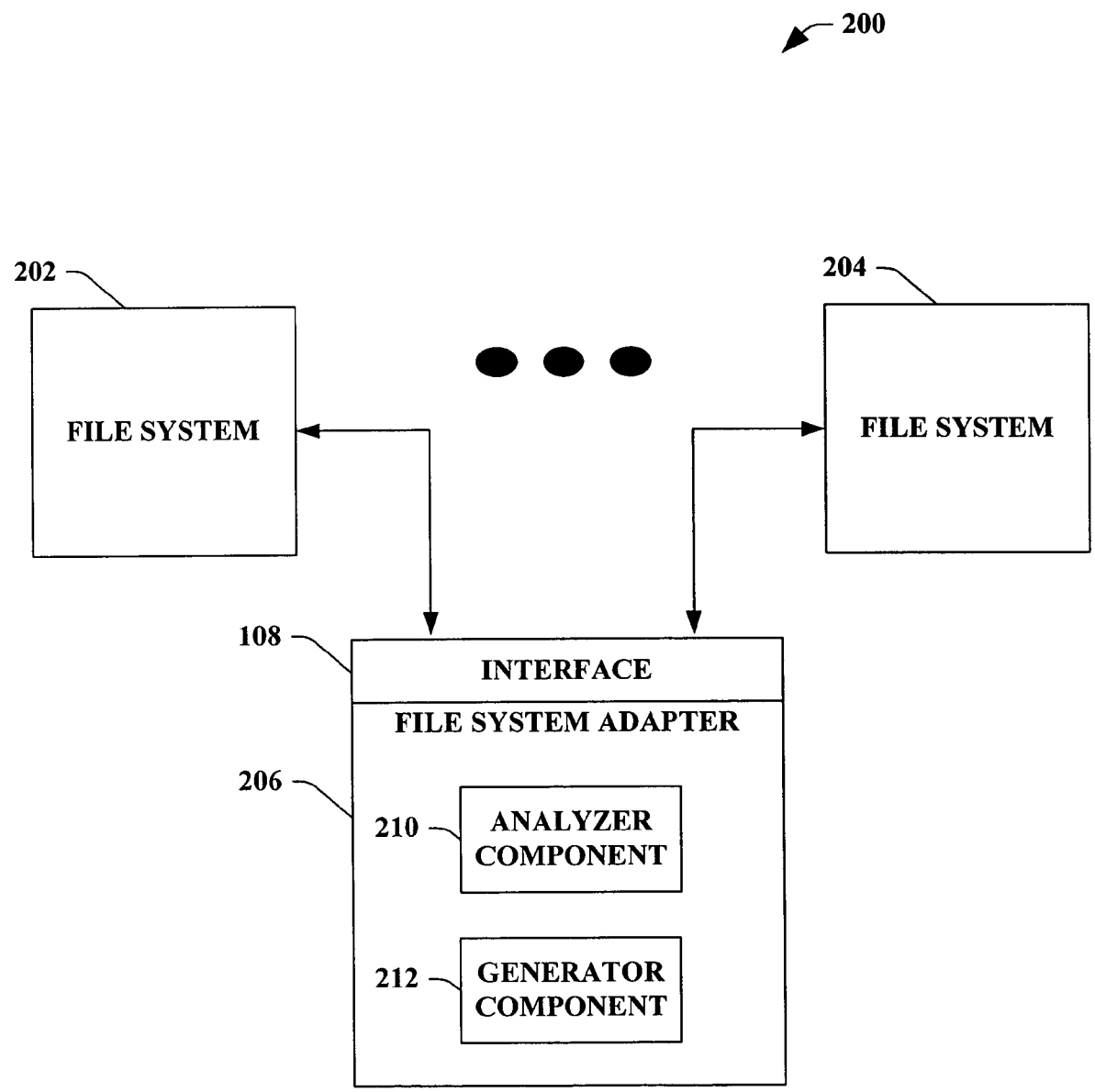
FIG. 2 illustrates a block diagram of an exemplary system that facilitates adapting at least two disparate file systems to provide uniformity.

FIG. 2 illustrates a system 200 that facilitates adapting at least two disparate file systems to provide uniformity. A file system adapter 206 can provide uniformity and/or compatibility between a file system 202 and a file system 204. However, it is to be appreciated and understood that the file system adapter 206 can provide adapting a plurality of disparate file systems. The file system 202 can be a file stream and directory based file system that utilizes at least one API and/or application. For instance, the API and/or application relating to the file system 202 can be, but is not limited to, a 16 bit, 32 bit, etc. version. The file system 204 can be a complex structure utilizing an item as a unit of consistency, wherein metadata, properties, relationships are implemented as instances of complex types. The file system 204 can be a data model that can describe the shape of data, declare constraints to imply certain semantic consistency on the data, and define semantic associations between the data. By utilizing the file system adapter 206, API's and/or applications related to the file system 202 can be utilized within the file system 204 uniformly. It is to be appreciated that the file system 202, file system 204, and the file system adapter 206 can be substantially similar to the file system 102, file system 104, and the file system adapter 106 in FIG. 1, respectively.

The file system adapter 206 can include an analyzer component 210 that analyzes the file system 202. The analyzer component 210 can determine the directories and/or files associated therewith to facilitate providing an adaptable and/or compatible system with the file system 204. The analyzer component 210 can determine at least one leaf node. It is to be appreciated that a leaf node can be represented as the file-backed item, whereas all directories and/or files of file system 202 can be represented as items in the file system 204. Thus, the directories and/or files that are not leaf nodes have a presence in the file system 204, but there is no stream associated therewith.

The file system adapter 206 can further include a generator component 212 that creates and/or generates a file-backed item. The generator component 212 can create the file-backed item based at least in part upon the analysis of the file system 202. For example, the generator component 212 can create the file-backed item for any leaf node associated to the file system 202, wherein the file-backed item is compatible with the file system 204 since the file-backed item is enriched by a file and/or a file stream from the file system 202. The generator component 212 can create the file-backed item with at least one of the following: the file-backed item has an associated (e.g., backing) file stream; the file-backed item cannot contain other items (e.g., they are leaf nodes in a namespace); the file-backed item can be ghosted (discussed infra); and a file attribute (discussed infra) is maintained for the file-backed item.

The file-backed item can act as a bridge between the file system 202 and the file system 204. Any item of the file system 204 can be designated as the file-backed item, if 1) at least part of the content is from the file and/or file stream of the file system 202, and/or 2) a content of the underlying file is to be manipulated by at least one API and/or application associated to the file system 202. The file-backed item in the file system 204 can store a metadata property associated with an item as well as the file stream associated to the item. It is to be appreciated that the file system 202 folder/directory/file hierarchy mechanisms can be represented in the file system 204 utilizing the container items that contain other items including file-backed items. Thus, an application utilizing the file system 202 API's can work seamlessly with the storage mechanism of file system 204.

Figure 3:
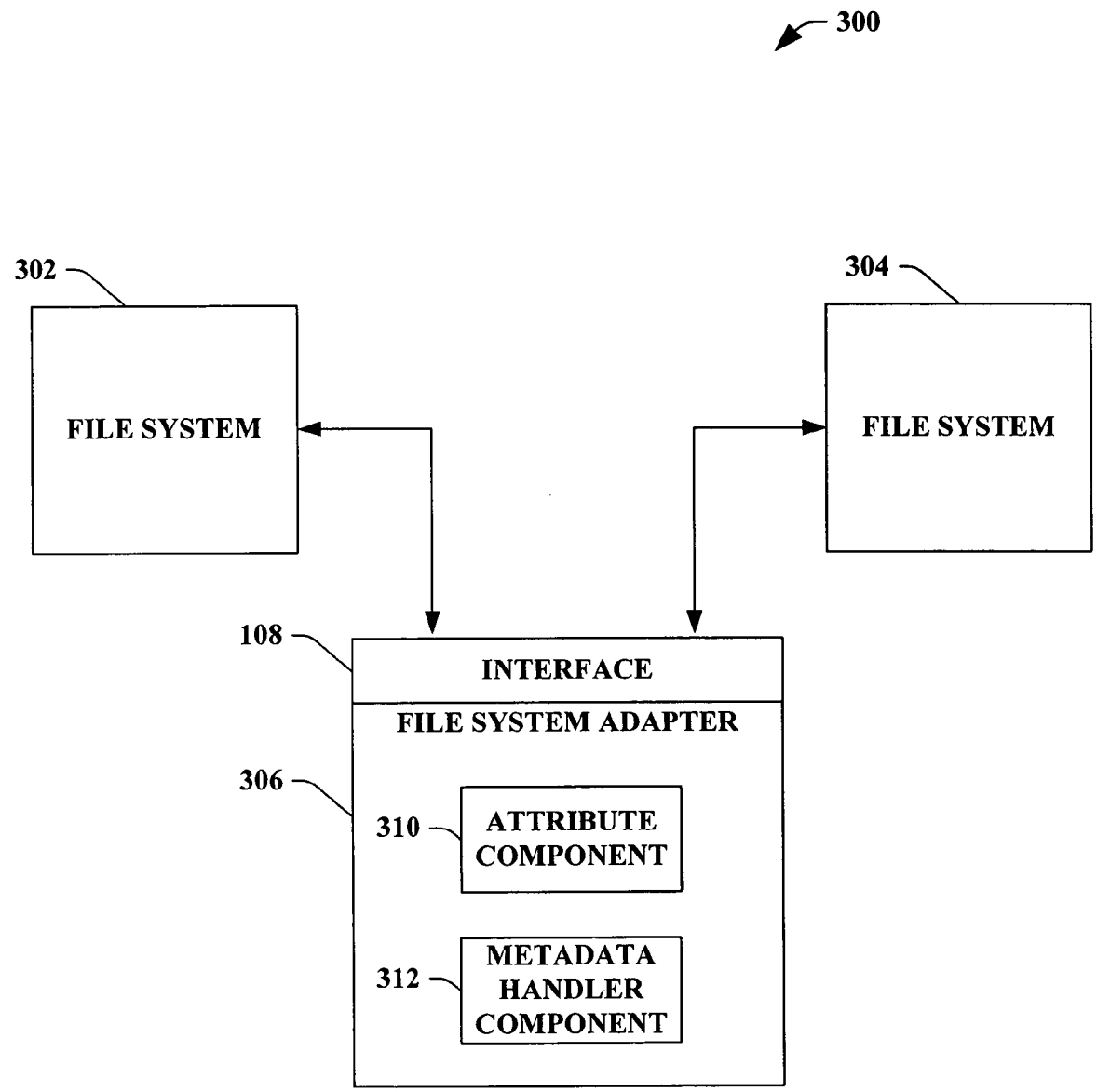
FIG. 3 illustrates a block diagram of an exemplary system that facilitates adapting a file stream associated file system and a metadata associated file system.

FIG. 3 illustrates a system 300 that facilitates adapting a file stream associated file system and a metadata associated file system. A file system adapter 306 can provide a uniform and/or compatible interaction between a file system 302 and a file system 304 that is disparate thereto. The file system adapter 306 can utilize a file-backed item as an item within the file system 304 that can populate at least one property and/or metadata with a file and/or a file stream associated to the file system 302. The file-backed item can act as a bridge between the file system 302 (e.g., file format) and the file system 304 (e.g., richly schematized instances of complex types).

The file system adapter 306 can include an attribute component 310 that provides attributes associated to the file and/or file stream associated with the file system 302 to the file system 304. For instance, the file system 302 utilizes a file stream based storage system, wherein a file can have at least one attribute such as, but is not limited to, read only, compressed, archived file, etc., wherein a bit and/or bits can represent such attributes. The attribute component 310 can allow the file-backed item that represents a file and/or file stream in the file system 302 to incorporate such attributes to the file system 304. It is to be appreciated that the attribute component 310 can represent and/or correspond such attributes as a property with the respective file-backed item. In one example, the attribute component 310 can provide an update to a file attribute upon the closing of the file stream through a call from the file system 302. The properties can be updated through an API associated to the file system 304 (discussed infra).

The attribute component 310 can further provide an item attribute that is a nested type that can contain attributes common to all items. The attributes can be settable by any application working through the file system 304 and/or an API associated with the file system 304. The following attributes can be provided as an example to be utilized by an application and/or compatibility with the file system 302.

| Name | Type | Description |
| --- | --- | --- |
| IsArchive | FileStorageSystem.Boolean | TRUE if the item is marked for Archival. Applications can set and use this property. FileStorageSystem may not interpret/enforce semantics of this property This has a default = true |
| IsHidden | FileStorageSystem.Boolean | TRUE, if the item is marked to be hidden. Applications may use this attribute to show or hide an item. FileStorageSystem may not interpret/enforce semantics of this property This has a default = false |
| IsReadOnly | FileStorageSystem.Boolean | Item is marked read only. Applications may want to prevent updates to these items. FileStorageSystem may not interpret/enforce semantics of this property This has a default = false. |
| IsSystem | FileStorageSystem.Boolean | Indicates if an item is a part of the operating system. Applications can update this property and may use to interpret this |

-continued

| Name | Type | Description |
|---|---|---|
| | | for display or other purpose. FileStorageSystem may not interpret/enforce semantics of this property This has a default = false. |
| IsTemporary | FileStorageSystem.Boolean | Indicates that the item is used for temporary storage. FileStorageSystem may not interpret/enforce semantics of this property This has a default = false. |

The file system adapter 306 can include a metadata handler component 312 that allows at least one property to stay in sync between the item, the file-backed item, and a backing file (e.g., the file in the file system 302 that is represented by the file-backed item). For example, a property can be modified in the backing file stream, wherein the metadata handler component 312 can promote the new value to the appropriate field in the item within the file system 304. In another example, a property can be changed through an API associated to the file system 304; the metadata handler component 312 can demote the new value to the backing file stream within the file system 302. It is to be appreciated and understood that a different type of file-backed item can have a different metadata handler component 312 associated therewith.

For instance, promotion can be done asynchronously by the metadata handler component 312 after a file has been closed by the application. On the other hand, demotion can be asynchronously. A special item property can specify whether the promoted properties are in sync between an item and the backing file or not. A promotion status can specify an item promotion error status. The status can be set asynchronously with a file close on the default stream of a file-backed item. The status can be NULL for a non-file backed item. The table below depicts possible values for a promotion status.

| Type | Value | State | Description |
|---|---|---|---|
| Int32 | 0 | READY | The item has changed; the promotion has run successfully. |
| | 1 | STALE | The item has changed; the promotion hasn't run. |
| | 2 | ERROR_STALE | The item has changed; the promotion has run and failed for some fatal reason. |
| | 3 | ERROR_DELAYED | The item has changed; the promotion has run and failed for some transient reason. |

It is to be appreciated that the file system 306 can utilize an item table, wherein at least one item and/or file-backed item stored. The item table can utilize a file stream table and/or a file attribute table that associates a file stream and/or a file attribute to a respective file-backed item that can be stored in the item table. The file stream table and/or the file attribute table can store the respective file stream and file attribute in relation to the item that is to be the file-backed item (e.g., containing the file stream and/or file to enrich and/or populate at least one property). It is to be appreciated that the file attributes can be stored in an item table. The file attribute semantics can be implemented by, for example, an update API.

Furthermore, the global item table can contain the following additions for a file-backed item.

| Name | Type | Description |
|---|---|---|
| (Current columns of TableItem) | | |
| LastAccessTime | FileStorageSystem.DateTime | The last time that the file or directory was accessed. Base does not update this attribute: Can update as needed. It has a very high update frequency and hence it is not synced. |
| StreamSize | BigInt | Size of the stream |
| AllocationSize | Bigint | Allocation size for the file stream |
| PromotionStatus | Int32 | Promotion error flags. |

For example, the file streams table can have the following properties.

| Name | Type | Description |
|---|---|---|
| ItemId | Uniqueidentifier not null | FileStorageSystem Item identity. |
| RowId | Uniqueidentifier not null ROWGUIDCOL unique default (newid( )) | Unique identifier for each filestream. |
| Stream | varbinary(max) FILESTREAM not null | The filestream. |

The following is illustrated as an example of a file system that utilizes a file stream storage, wherein a 32 bit system is implemented and is not to be seen as a limitation of the subject invention. The following is an example of attributes for a 32 bit file system that can be supported by the system 300 and a file storage system (FSS) (e.g., file system 304).

| 32 bit File Attribute | Name In FSS | FSS Type | Default Value | Trust Level | 32 bit Semantics | FSS Semantics |
|---|---|---|---|---|---|---|
| Creation Time | Created | DateTime | Time when item is created | Update API, FSA-Store APIs, WRITE_CONTROL | Specifies the time that the file was created. | Specifies the time that the item was created. |

-continued

| 32 bit File Attribute | Name In FSS | FSS Type | Default Value | Trust Level | 32 bit Semantics | FSS Semantics |
|---|---|---|---|---|---|---|
| Change Time | Modified | DateTime | Time when item is created | Update API, FSA-Store APIs, WRITE_CONTROL | ChangeTime: Can be updated when attributes, file stream or directory contents are changed. | Specifies the last time the item was changed. |
| LastAccess Time | LastAccess Time | DateTime | Time when item is created | Update API, FSA-Store APIs, WRITE_CONTROL | Specifies new time that the file or directory was accessed. Updated if the new time of access is more than one hour greater than the value of the LastAccessTime attribute. | Specifies the last time the item was accessed. Updated if the time of access is more than one hour greater than the value of the LastAccessTime attrubute. |
| FILE_ATTRIBUTE_HIDDEN | IsHidden | Bool | FALSE | WRITE_CONTROL, | The file or directory is hidden. | The target item is not included in an ordinary folder listing. |
| EndOf File | StreamSize | Int32 | 0 | FSS-Store API | Specifies the absolute end-of-file position as a byte offset from the start of the file. Specifies the byte offset to the end of the file. | Specifies the absolute end-of-file position as a byte offset from the start of the backing file stream. Specifies the byte offset to the end of the file. |
| Allocation Size | Allocation Size | Int32 | 0 | FSS-Store API | Specifies the file allocation size, in bytes. Usually, this value is a multiple of the sector or cluster size of the underlying physical device. | Specifies the backing file stream allocation size, in bytes. Usually, this value is a multiple of the sector or cluster size of the underlying physical device. |
| FILE_ATTRIBUTE_ARCHIVE | IsArchive | Bool | TRUE | WRITE_CONTROL | The file or directory is an archive file or directory. Applications use this attribute to mark files for backup or removal. | The item is an archive file or directory. Applications use this attribute to mark files for backup or removal. |
| FILE_ATTRIBUTE_TEMPORARY | IsTemporary | Bool | FALSE | WRITE_CONTROL | Files: The file is being used for temporary storage. | The item is being used for temporary storage |
| FILE_ATTRIBUTE_READ ONLY | IsRead Only | Bool | FALSE | WRITE_CONTROL | The file can be read-only. | The item can be read-only. |

-continued

| 32 bit File Attribute | Name In FSS | FSS Type | Default Value | Trust Level | 32 bit Semantics | FSS Semantics |
|---|---|---|---|---|---|---|
| FILE_ATTRIBUTE_SYSTEM | IsSystem | Bool | FALSE | WRITE_CONTROL | The file or directory is part of, or is used exclusively by, the operating system. | The item is part of, or is used exclusively by, the operating system. |
| NumberOfLinks | | Calculated Value | | | The number of hard links to the file. | Always 1, Except Root directory has 0 |
| Delete Pending | | Calculated Value | | | The delete pending status. TRUE indicates that a file deletion has been requested. | TRUE if delete is pending on FBI through 32 bit. FALSE Otherwise |
| FILE_ATTRIBUTE_DEVICE | | Calculated Value | | | Reserved; do not use. | Always FALSE |
| FILE_ATTRIBUTE_DIRECTORY | | Calculated Value | | | The handle identifies a directory. | FALSE for file-backed items. TRUE otherwise |
| FILE_ATTRIBUTE_OFFLINE | IsGhosted | Bool | FALSE | This flag should not be settable through 32 bit API. | This attribute indicates that the file data has been physically moved to offline storage. This attribute is used by Remote Storage, the hierarchical storage management software. | Specifies if the item is ghosted or not. |

Continuing with the previous example, the following attributes can be partially supported and/or entirely supported.

| 32 bit File Attribute | Name In FSS | FSS Type | Default Value | Trust Level | Semantics | FSS Semantics |
|---|---|---|---|---|---|---|
| LastWrite Time | Modified | DateTime | CreationTime | Update APIs, FSA-Store API, WRITE_CONTROL | Specifies the last time the file stream was modified or the enumeration results of a directory changed. | Specifies the last time the item was changed. |

Figure 4:
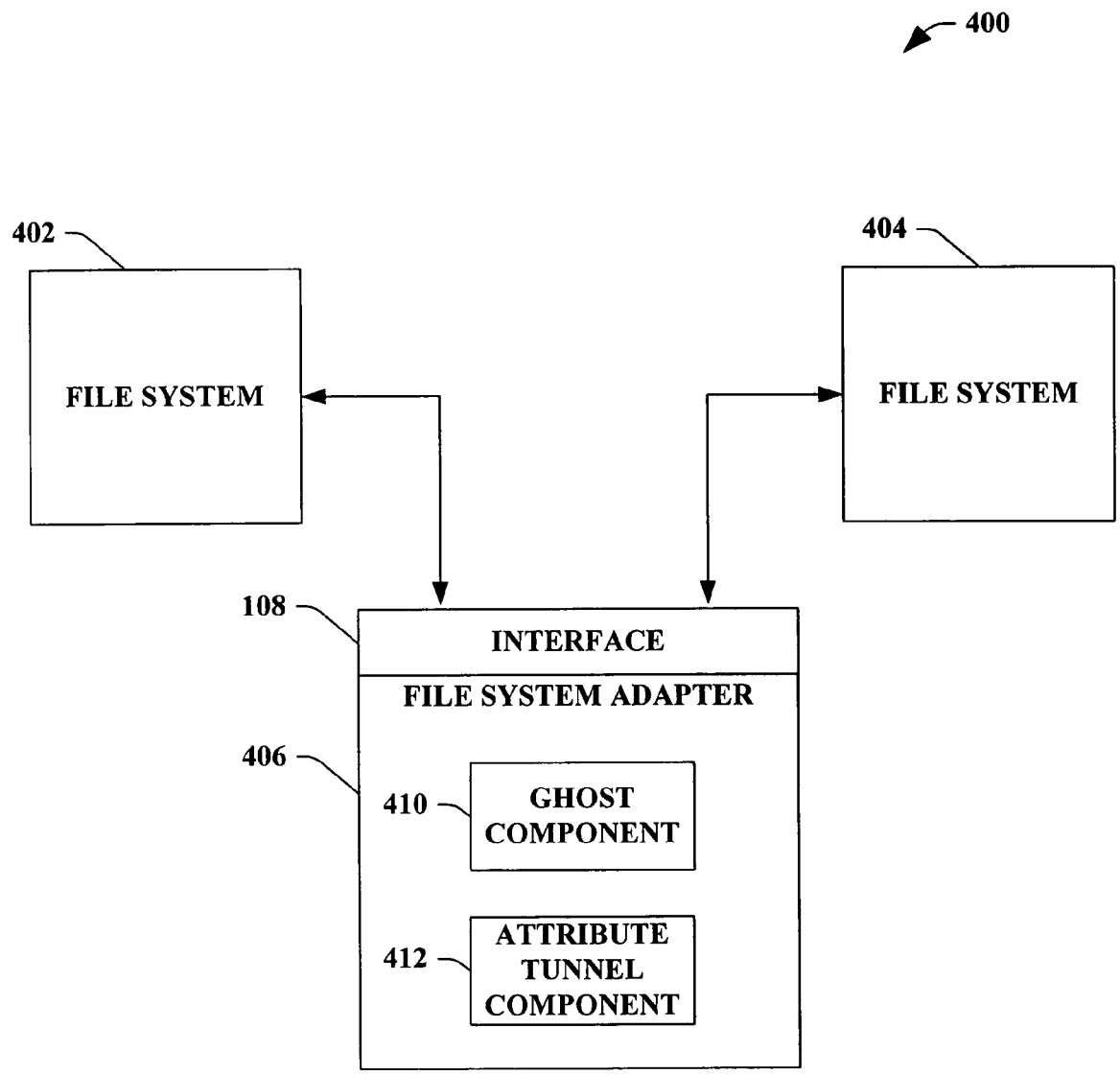
FIG. 4 illustrates a block diagram of an exemplary system that facilitates synchronizing at least two disparate file systems.

FIG. 4 illustrates a system 400 that facilitates adapting and/or incorporating a file system with a disparate file system. A file system adapter 406 can provide uniformity with a file system 402 and a file system 404. The file system 402 can be based upon a file stream and include a directory, a folder, and a file. For example, the file system 402 can be a 16 bit file system, a 32 bit file system (e.g., a fat file system), wherein the API (e.g., a 16 bit API, a 32 bit API) utilizes such file system for the respective operating system. The file system 404 can be a complex type based system, and includes a type, an item, a property, a relationship, an instance of a type, a container, etc. It is to be appreciated that the file system 404 is to represent units of information as objects with associated metadata and/or properties. Furthermore, the file system 402 and the file system 404 can be substantially similar to the file systems 302, 304, 202, 204, 102, and 104 in FIGS. 3, 2, and 1 respectively.

The file system adapter 406 can create a file-backed item based at least upon the file structure of the file system 402 to allow seamless integration into the file system 404. The file-backed item can be populated and/or enriched by a file and/or a file stream to create and/or attach properties utilized by the file system 404. The file-backed item can allow an API for the file system 402 to be utilized in the file system 404 regardless of the API format requiring the file stream because the file-backed item is a type that has the file and/or file stream associated thereto. In other words, the file-backed item is a bridge between the file system 402 and the file system 404.

The file system adapter 406 can include a ghost component 410 that provides synchronization for a property of the file-backed item. The ghost component 410 can create a ghosted item that is a replica of another file-backed item but does not contain the file stream. Furthermore, the ghost component 410 can provide ghosting that is an operation for creating a ghosted item and/or converting an existing item into a ghosted item. The ghost component 410 can also provide unghosting which is an operation for converting a ghosted item into a regular item. Although the ghost component 410 is incorporated into the file system adapter 406, it is to be appreciated that the ghost component 410 can be a separate component, and/or a stand-alone unit.

The following table can provide a further description in relation to the capabilities of the ghost component 410.

| Name | Direction | Type | Description |
| --- | --- | --- | --- |
| itemId | IN | Guid | Id of the item to Ghost/UnGhost |
| isGhost | IN | BIT | Specifies whether the item should be ghosted or unghosted. |
| concurrencyToken | IN | BIGINT | cncurrencyToken is the expected concurrency token value of the item. If the input value is NULL no check is done. Default value is NULL. |

In one example, the ghost component 410 can ghost an entity for the file system 404. If the item is not a file-backed item, an error can be returned. If the item is already ghosted, the operation is a noop and returns a success. The ghost component 410 can propagate that information to all sub entities in that ghosted item tree (e.g., all embedded items, relationships, and/or extensions) and sets a bit true to inform that the entity state is ghosted. The file stream contents can be deleted for the ghosted item after the ghosting has occurred (e.g., it sets the file stream to NULL).

In another example, an entity can be unghosted by the ghost component 410. If the item is not a file-backed item an error is returned. If the item is not ghosted, the operation is a noop and returns a success. A bit can be set to false to inform the entity state that the entity is not ghosted. A file stream of zero length can be created and added to a file stream table. Unghosting does not restore the file stream contents, a caller has to explicitly populate the file stream with appropriate contents (e.g., preferably in the substantially similar transaction). In one instance, the usage pattern for an unghost operation can be the following: open transaction; unghost item; populate/restore the file stream contents; and commit transaction.

The file system adapter 406 can include an attribute tunnel component (ATC) 412. The ATC 412 provides attribute tunneling to facilitate name changing and/or conserving resources within the file system 404. The file system 402 utilizes a temporary file, wherein such file is created upon an open, access, and/or edit. When the file is saved in the file system 402, the temporary file and the saved file names are swapped. For instance, a file food.doc can be created and accessed in the file system 402. Upon access within the file system 402, the file f1.tmp can be created. The food.doc can be moved to the f2.tmp, wherein f1.tmp is moved to food.doc. The file f2.tmp can then be deleted in the file system 402. However, based on the file system 404 structure and utilization of an item to represent units of information, an API call to update a name is an expensive resource. In general, the ATC 412 allows the associated file stream to be swapped between two file-backed items. For example, the file streams stored in a table file streams table can be utilized by the ATC 412, wherein the item ID's of the two file stream can be swapped. Although depicted as incorporated into the file system adapter 406, it is to be appreciated that the ATC 412 can be a stand alone component, incorporated into any suitable component, and/or a combination thereof.

Figure 5:
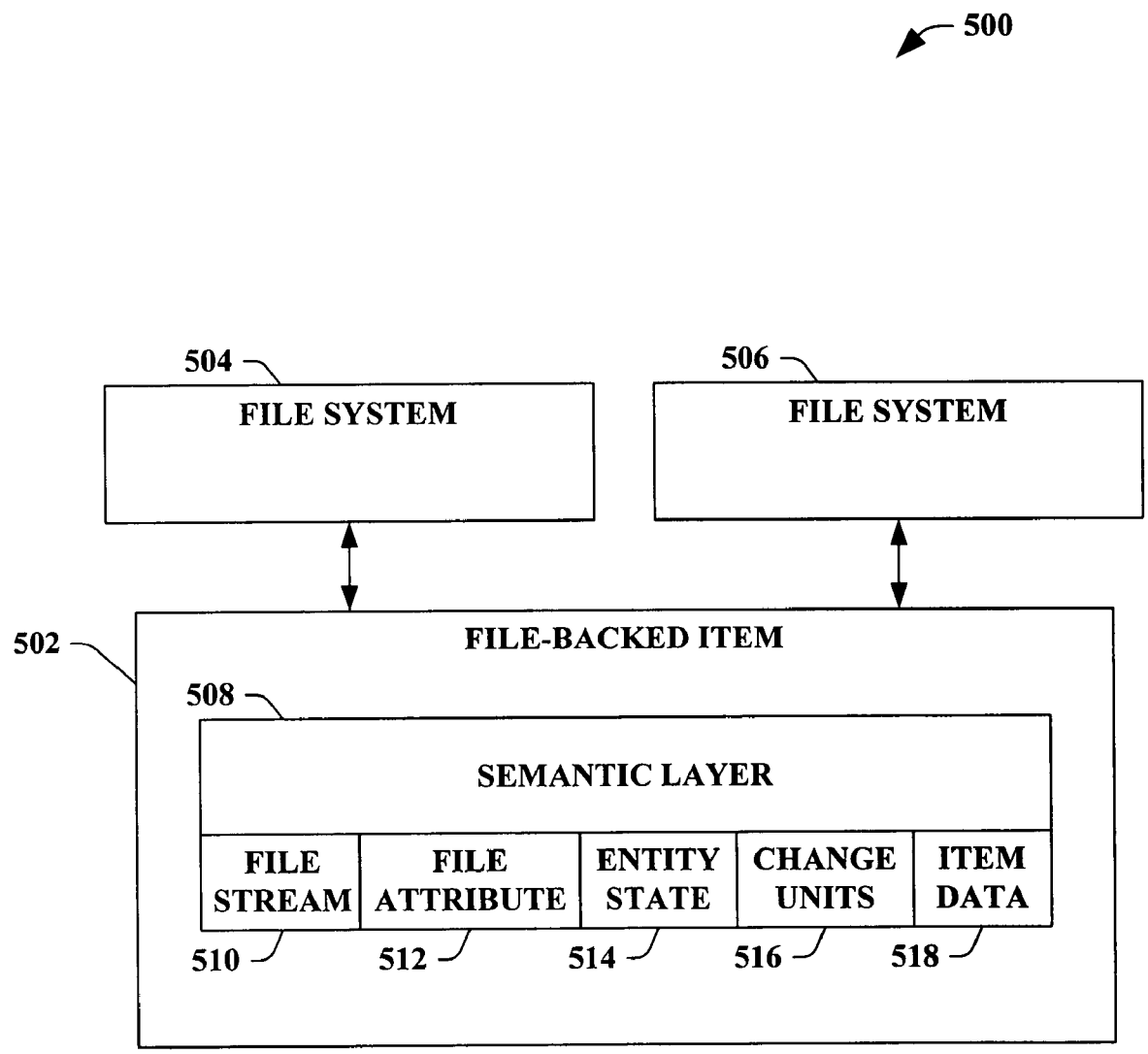
FIG. 5 illustrates a block diagram of a file-backed item that facilitates adapting one file system to a disparate file system.

FIG. 5 illustrates a file-backed item created to facilitate adapting a plurality of disparate file systems. In particular, a file-backed item 502 can provide uniformity between a file system 504 and a file system 506. It is to be appreciated that file system 504 can be substantially similar to the file systems 402, 302, 202, and 102 of FIGS. 4, 3, 2, and 1 respectively. Moreover, the file system 506 can be substantially similar to the file systems 404, 304, 204, and 104 of FIGS. 4, 3, 2, and 1 respectively.

The file-backed item 502 can provide a semantic layer 508 that provides semantics (e.g., implemented by an update API, and/or a metadata handler component depicted supra). The file-backed item 502 also includes a file stream 510. The file stream 510 can be of the file system 504 technology. The applications associated to the file system 504 (e.g., 32 bit application and/or API's) can operate directly on the file streams for files stored in the file system 506 utilizing the file-backed item 502. Many file system 504 technologies such as, but not limited to, cache management, streaming, byte-range locking, and memory-mapping need not be re-implemented by the file system 506. The underlying streams are associated to the file-backed item 502. Furthermore, the file stream 510 can be protected by at least one access control list (ACL). The file stream 510 can be represented in a file stream table such as the following table.

| Name | Type | Description |
| --- | --- | --- |
| ItemId | Uniqueidentifier not null | File Storage System Item identity. |
| RowId | Uniqueidentifier not null ROWGUIDCOL unique default (newid( )) | Unique identifier for each file stream. |
| Stream | varbinary(max) FILESTREAM not null | The file stream. |

In addition, the file-backed item 502 can also include a file attribute 512, an entity state 514, a change units 516, and an item data 518. The file attribute 512 can be stored in the item table, wherein the file attribute semantics can be implemented by, for example, an update API. The entity state 514 can have attributes stored in an entity state item user-defined type (UDT) field. The semantics for the entity state attributes can be implemented by the update API and/or the metadata handler component (not shown). Moreover, the file-backed item 502 can utilize the change units 516 to change at least one unit and/or the item data 518 that represents data related to an item.

In one example, the following table can represent at least one characteristic of the entity state 514.

| Name | Type | Description |
| --- | --- | --- |
| IsCompoundItemType | Boolean | TRUE, if the entity is an Item type and is declared as a "compound item" in the schema declaration. False, if the entity is an item type and is NOT declared to be a compound item (e.g., declared as a generic container) in the schema declaration. If the entity is not an item type (e.g., the entity is a link, itemfragment or an extension), the value of this bit will be the same as its owner/source item. This has a default = true. |
| RootCompoundItemId | Guid | Stores the ItemId of the topmost compound Item that this entity is contained in. Value is NULL if this is not part of a compound item hierarchy. (e.g., this is a "true generic container"). If this entity is the topmost Root compound item, value can be the same as the item id. If this entity is contained within a compound item hierarchy, value is the item id of the topmost RootCompound item up the hierarchy. This has a default = false |
| IsRootFileBackedItem | Boolean | TRUE, if the item is a Root File-Backed item. FALSE, if the item is not a File-Backed Item or if the item is not a root File-backed Item (e.g., a contained item in a File-Backed item tree) For all other entities (links, extensions and itemfragments), this flag has the same value as their owning/source item. This has a default = false |
| RootFileBackedItemId | Guid | Stores the ItemId of the root File-Backed item that this entity is contained in. Value is NULL if this is not part of a File-Backed Item. If this entity is the Root File-Backed item, value can be the same as the item id. If this entity is contained within a File-Backed Item tree, value is the item id of the Root File-Backed item. |
| IsGhost | Boolean | TRUE, if the entity is (part of) a ghosted replica of another item. This has a default = false |

Figure 6:
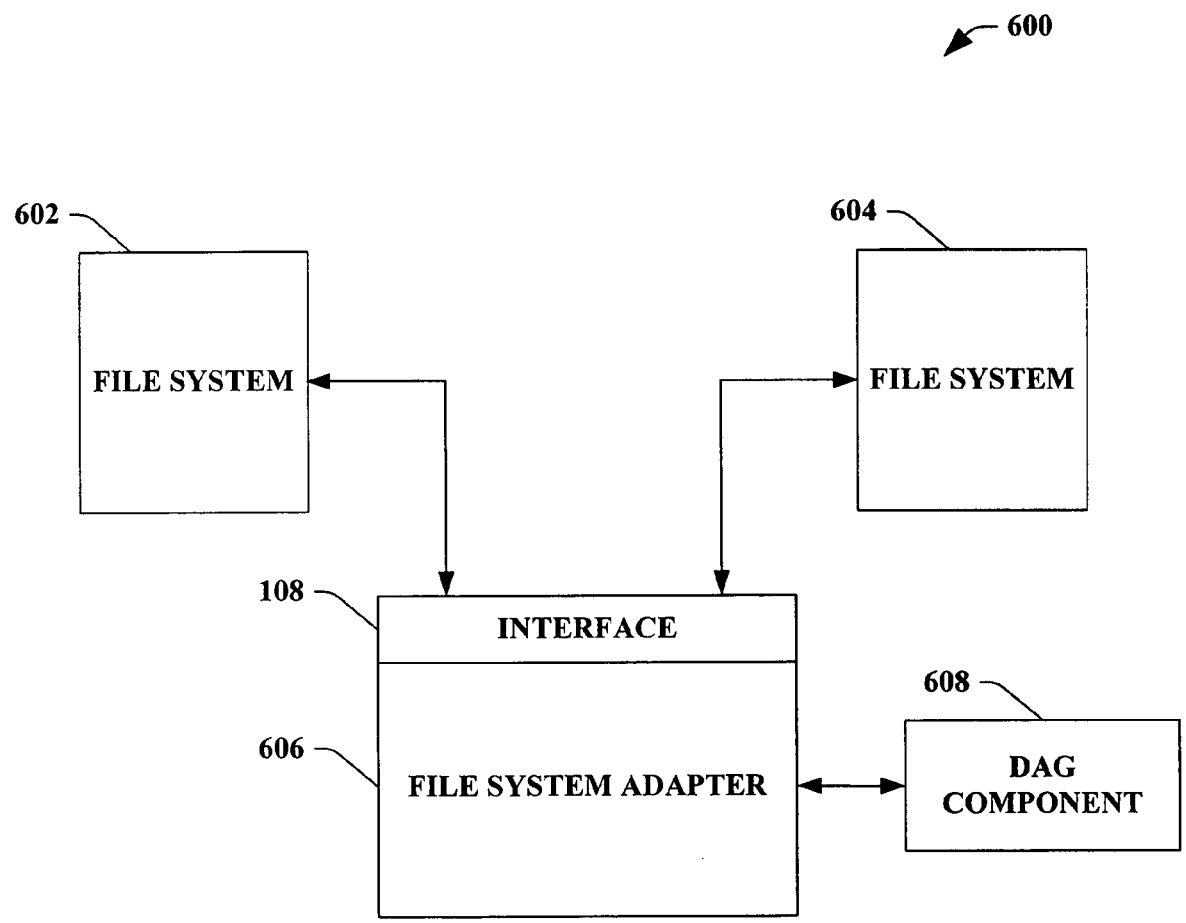
FIG. 6 illustrates a block diagram of an exemplary system that facilitates adapting a file stream associated file system and a metadata associated file system.

FIG. 6 illustrates a system 600 that facilitates adapting a file stream associated file system and a metadata associated file system. A file system adapter 606 can provide uniformity and/or seamless integration between a file system 602 (e.g., file stream based system utilizing 32 bit API's) and a file system 604 (e.g., object based system utilizing an item, a type, a property and relationships to represent units of information). It is to be appreciated that the file system 602 can be substantially similar to the file systems 504, 402, 302, 202, and 102 in FIGS. 5, 4, 3, 2, and 1 respectively. Additionally, the file system 604 can be substantially similar to file systems 506, 404, 304, 204, and 104 in FIGS. 5, 4, 3, 2, and 1 respectively.

A directed acyclic graph (DAG) component 608 can be utilized in conjunction with the subject invention. The DAG component 608 can utilize a directed graph without any cycles, wherein for any vertex, there is no directed path starting and ending with such vertex. A source is a vertex with no incoming edges, while a sink is a vertex with no outgoing edges. A finite DAG has at least one source and at least one sink. The length of a DAG is the length (e.g., number of edges of a longest directed path). It is to be appreciated that the file system 602 does not incorporate a DAG, while the file system 604 can utilize the DAG component 608 via the file system adapter 606. Although depicted as a stand-alone unit, the DAG component 608 can be incorporated into the file system adapter 606 and/or any other suitable component. By utilizing the DAG component 608, a file can simultaneously describe two directories. For example, when a file is deleted from a directory and is physically removed, the file can still be parented to this.

Figure 7:
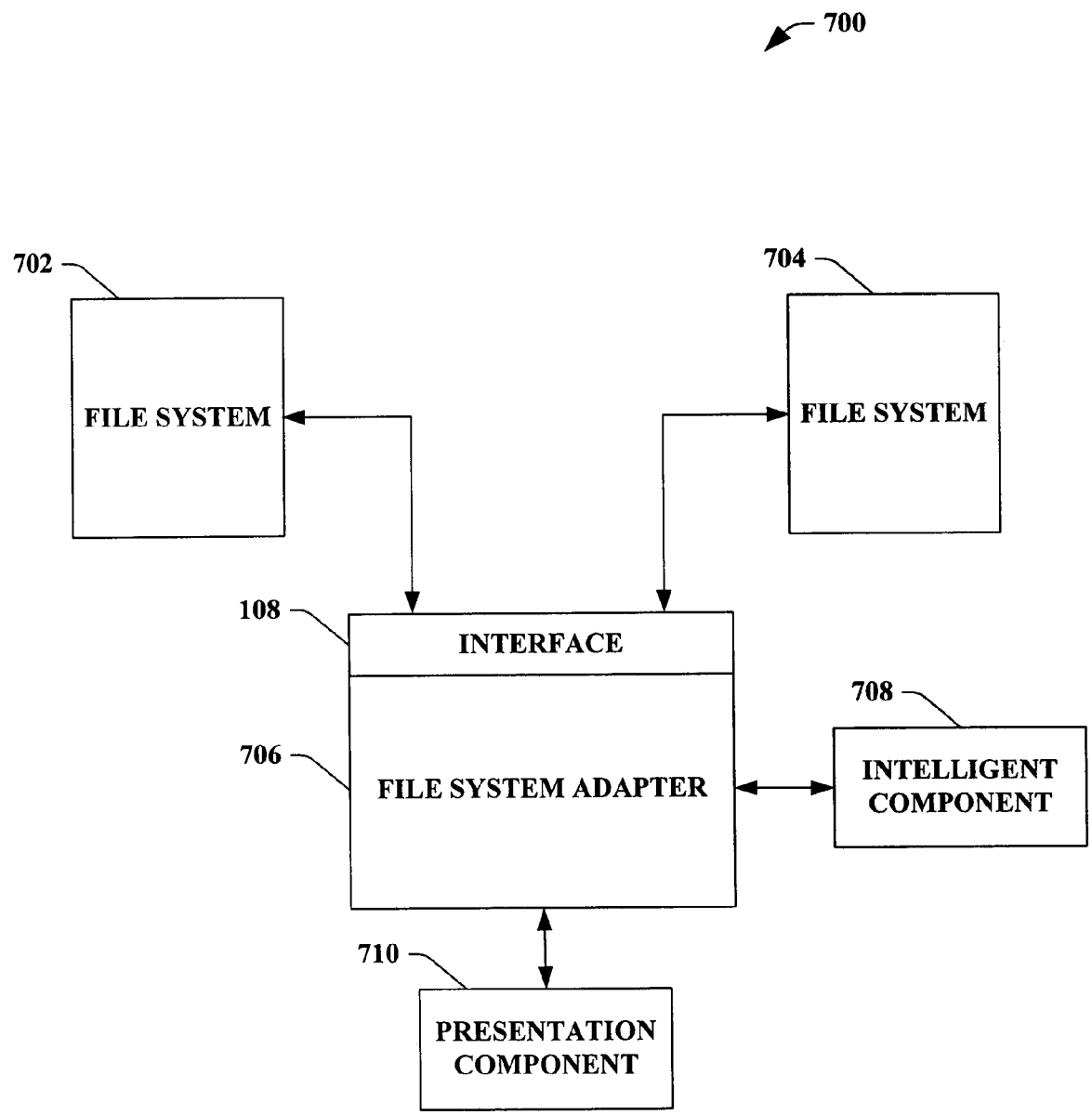
FIG. 7 illustrates a block diagram of an exemplary system that facilitates adapting a file stream associated file system and a metadata associated file system.

FIG. 7 illustrates a system 700 that employs intelligence to facilitate adapting a file system with a disparate file system. The system 700 can include a file system 702, a file system 704, a file system adapter 706, and an interface 108 that can all be substantially similar to respective components described in previous figures. The system 700 further includes an intelligent component 708. The intelligent component 708 can be utilized by the file system adapter 706 to facilitate adapting at least two disparate file systems. For example, the intelligent component 708 can be utilized to facilitate determining a file structure of the file system 702.

It is to be understood that the intelligent component 708 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 710 can provide various types of user interfaces to facilitate interaction between a user and any component coupled to the file system adapter 706. As depicted, the presentation component 710 is a separate entity that can be utilized with the file system adapter 706. However, it is to be appreciated that the presentation component 710 and/or similar view components can be incorporated into the file system adapter 706 and/or a stand-alone unit. The presentation component 710 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the file system adapter 706.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
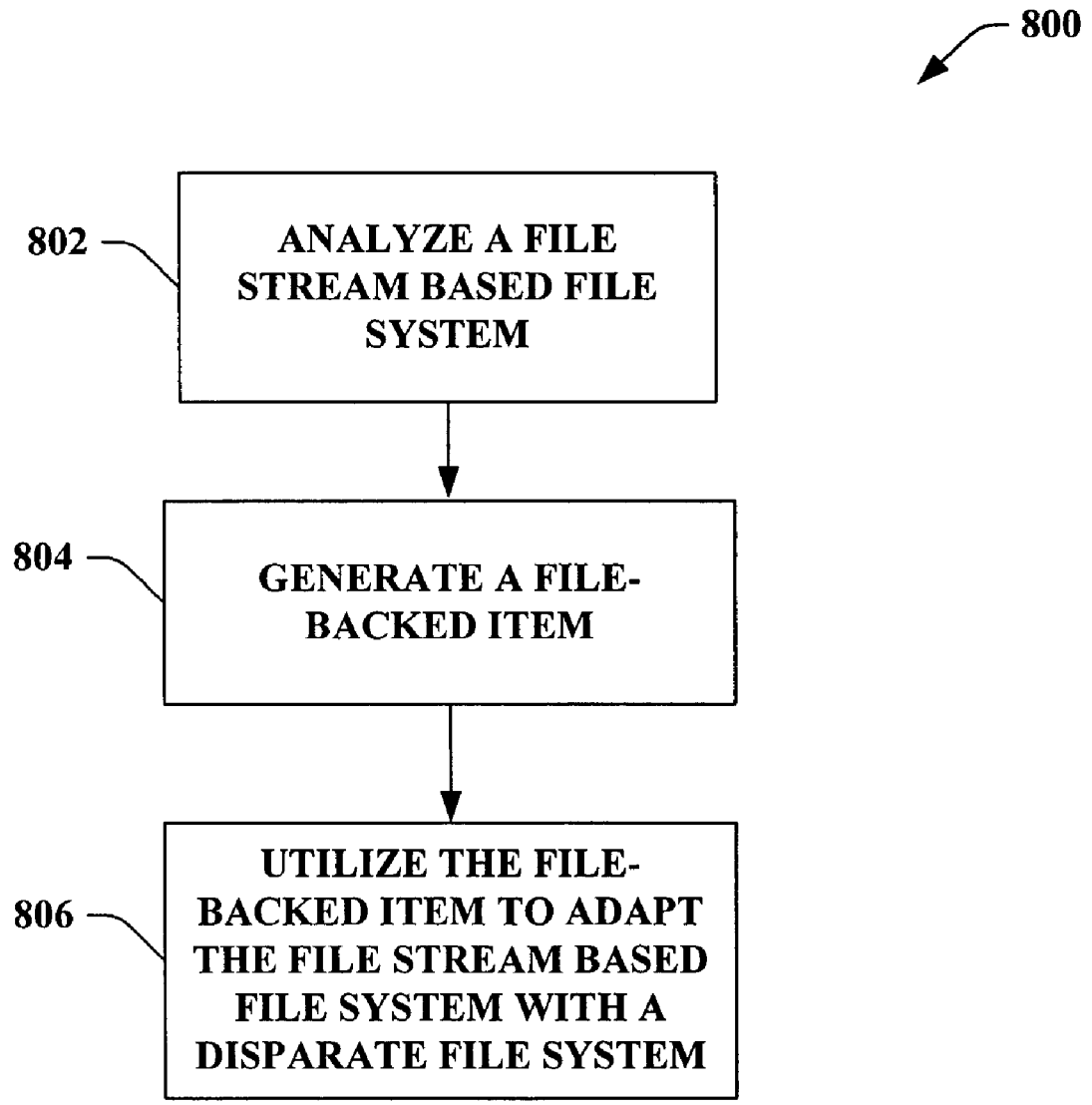
FIG. 8 illustrates an exemplary methodology for adapting at least two disparate file systems to provide uniformity.
Figure 9:
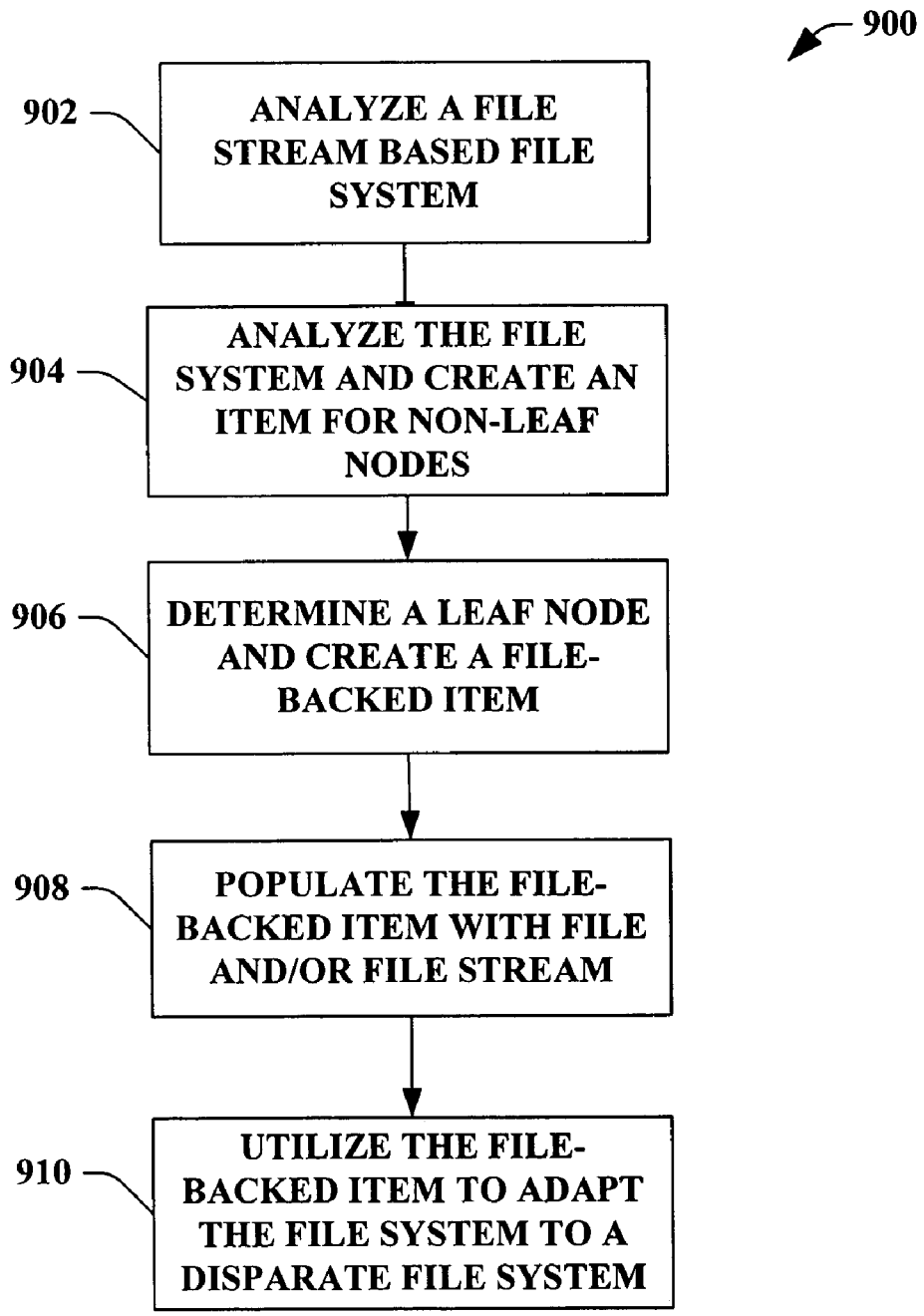
FIG. 9 illustrates an exemplary methodology for adapting one file system to a disparate file system.
Figure 10:
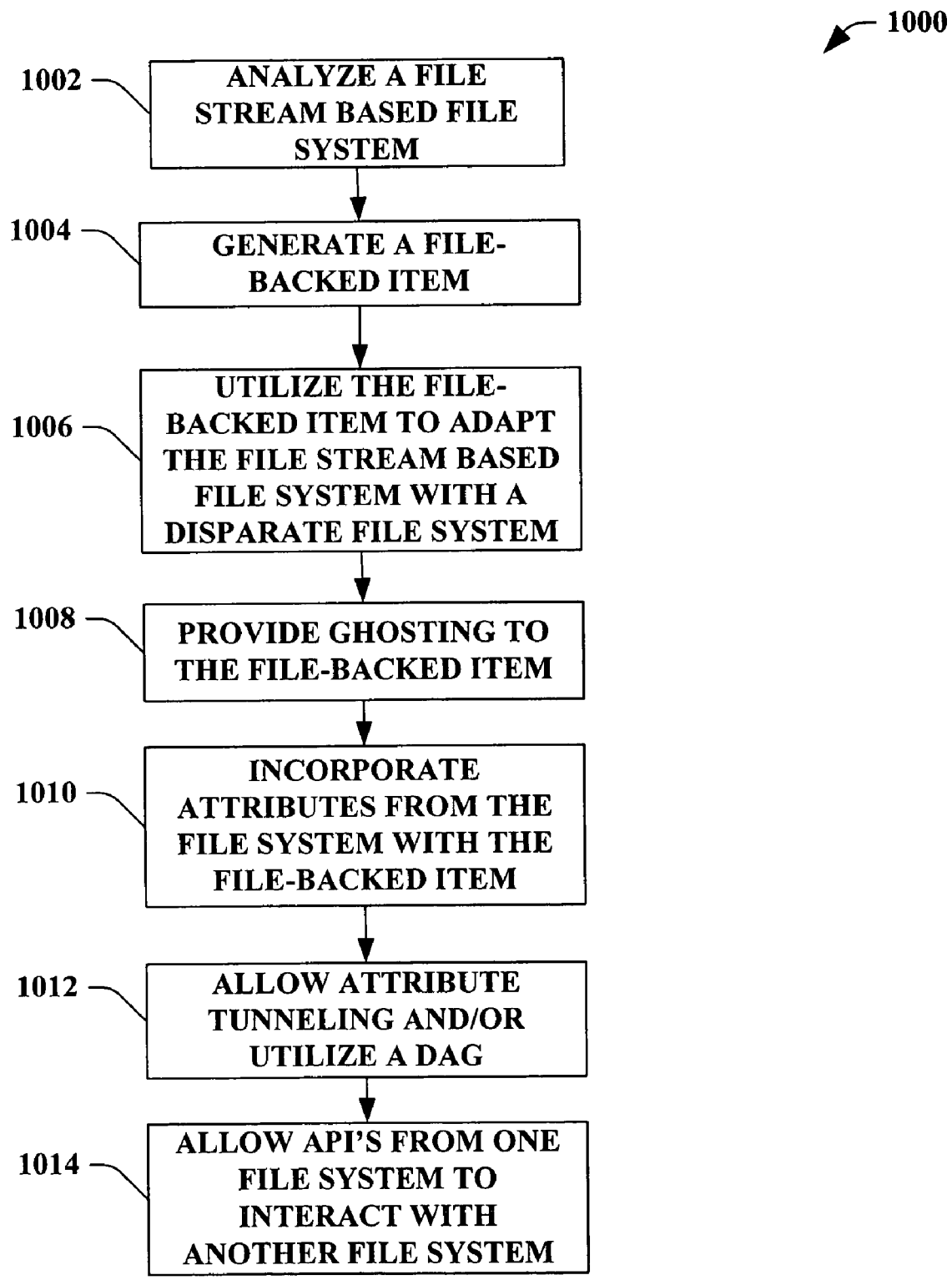
FIG. 10 illustrates an exemplary methodology for adapting a file stream associated file system and a metadata associated file system.

FIGS. 8-10 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates adapting and/or providing uniformity to at least two disparate file systems. A first file system can be a file storage system, wherein the structure is based on a file stream and/or a directory. The first file system can utilize the file stream such that an application and/or API can enrich the file stream to provide more structure. A second file system can be a more complex model, wherein an item, a sub-item, a property, and a relationship are defined to allow the representation of information within the second file system as instances of complex types. An item can be defined as the smallest unit of consistency in the second file system, which can be independently secured, serialized, synchronized, copied, backup/restored, etc. The item is an instance of a type, wherein all items in the second file system can be stored in a single global extent of items. The second file system can be based upon at least one item and/or a container structure. The second file system can be a storage platform that exposes rich metadata that is buried in files as items.

At reference numeral 802, the first file system based on the file stream can be analyzed. Such analysis can determine the file structure, and content for which to be utilized to provide uniformity. At reference numeral 804, a file-backed item can be created based at least upon the analysis. For example, the analysis can determine a 32 bit file storage system and the number of leaf nodes associated to such structure. Thus, the file-backed item can be created for each leaf node associated to the first file system, while an item can be utilized to represent a file and/or directory that is not a leaf node. The file backed-item can be an item within the second file system that relies on a file and/or file stream to populate some or all of its properties. The file-backed item can act as a bridge between the first file system and the second file system. At reference numeral 806, the file-backed item can be utilized to provide uniformity between the two disparate file systems based at least in part upon the first file system utilizing a file stream and a file and the second file system incorporating the file-backed item which contains the file and/or file stream that can relate to the first file system.

FIG. 9 illustrates a methodology 900 for adapting one file system to a disparate file system. At reference numeral 902, a first file system that utilizes a file and/or a file stream as its structure is analyzed. From such analysis, an item is created at reference numeral 904 each directory and/or file that is not a leaf node with the first file system. At reference numeral 906, a leaf node can be determined to exist in the first file system, wherein a file-backed item is created thereto. The file-backed item is an item associated to a second file system utilizing complex instances of a type to represent a unit of information. At reference numeral 908, the file-backed item is enriched and/or populated with a file, a file stream, an attribute, a security characteristic, etc. to represent the file as an item in the second file system. At reference numeral 910, the file-backed item is utilized to adapt the first file system to the second file system.

FIG. 10 illustrates a methodology 1000 that facilitates adapting a file stream structured file system and a metadata associated file system. At reference numeral 1002, a file stream structured file system (e.g., referred to as the first file system) is analyzed. At reference numeral 1004, a file-backed item can be generated based at least in part upon the analysis of the first file system. The file-backed item is an item associated to a second file system, wherein a file and/or a file stream can enrich at least one of its properties. At 1006, the file-backed item can be utilized to adapt the first file system with the second file system.

At reference numeral 1008, ghosting can be provided to ensure attribute integrity and synchronization between the first file system and the second file system. For example, a ghosted item can be created such that it is a replica of another file-backed item but does not contain the file stream. Moreover, ghosting can be provided that is an operation for creating a ghosted item and/or converting an existing item into a ghosted item. Additionally, unghosting can be utilized, which is an operation for converting a ghosted item into a regular item. At reference numeral 1010, an attribute from the first file system can be incorporated and/or utilized with the file-backed item associated to the second file system. The first file system can contain the attribute, which can be, but is not limited to, read only, compressed, archived file, etc., wherein a bit and/or bits can represent such attributes. It is to be appreciated that the attributes can be incorporated into the second file system via the file-backed item.

At reference numeral 1012, attribute tunneling can be utilized and/or a DAG. The attribute tunneling can provide the swapping of a file stream between at least two file-backed items to allow the conservation of resources and/or changing of names between temporary files in the second file system. The DAG can provide a graph of connected items that have no cycles. At reference numeral 1014, the API's from the first file system can be utilized with the second file system by employing the file-backed item, which provides seamless integration. In other words, the file-backed item contains metadata properties associated with an item as well as the file stream associated with the item. The file-backed items can be manipulated by API's associated with the second file system as well as the API's part of the first file system.

Figure 11:
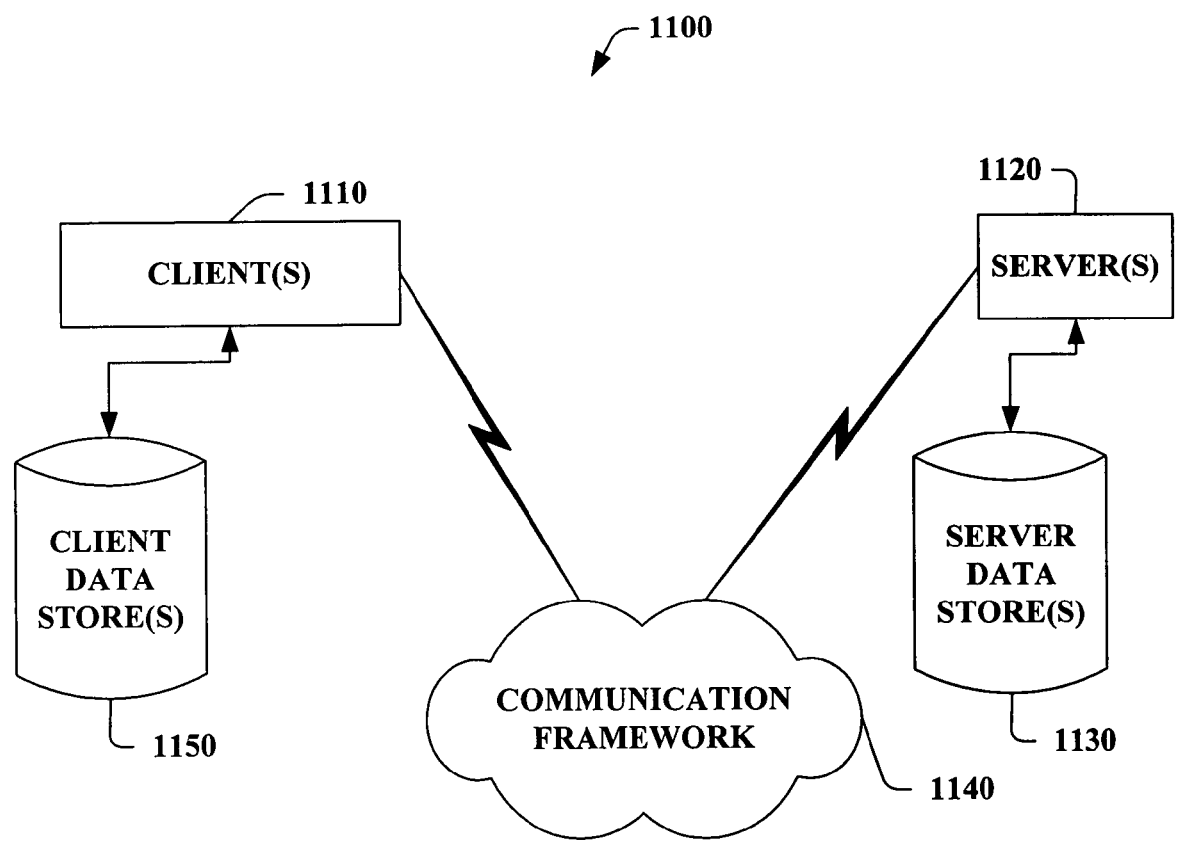
FIG. 11 illustrates an exemplary networking environment, wherein the novel aspects of the subject invention can be employed.
Figure 12:
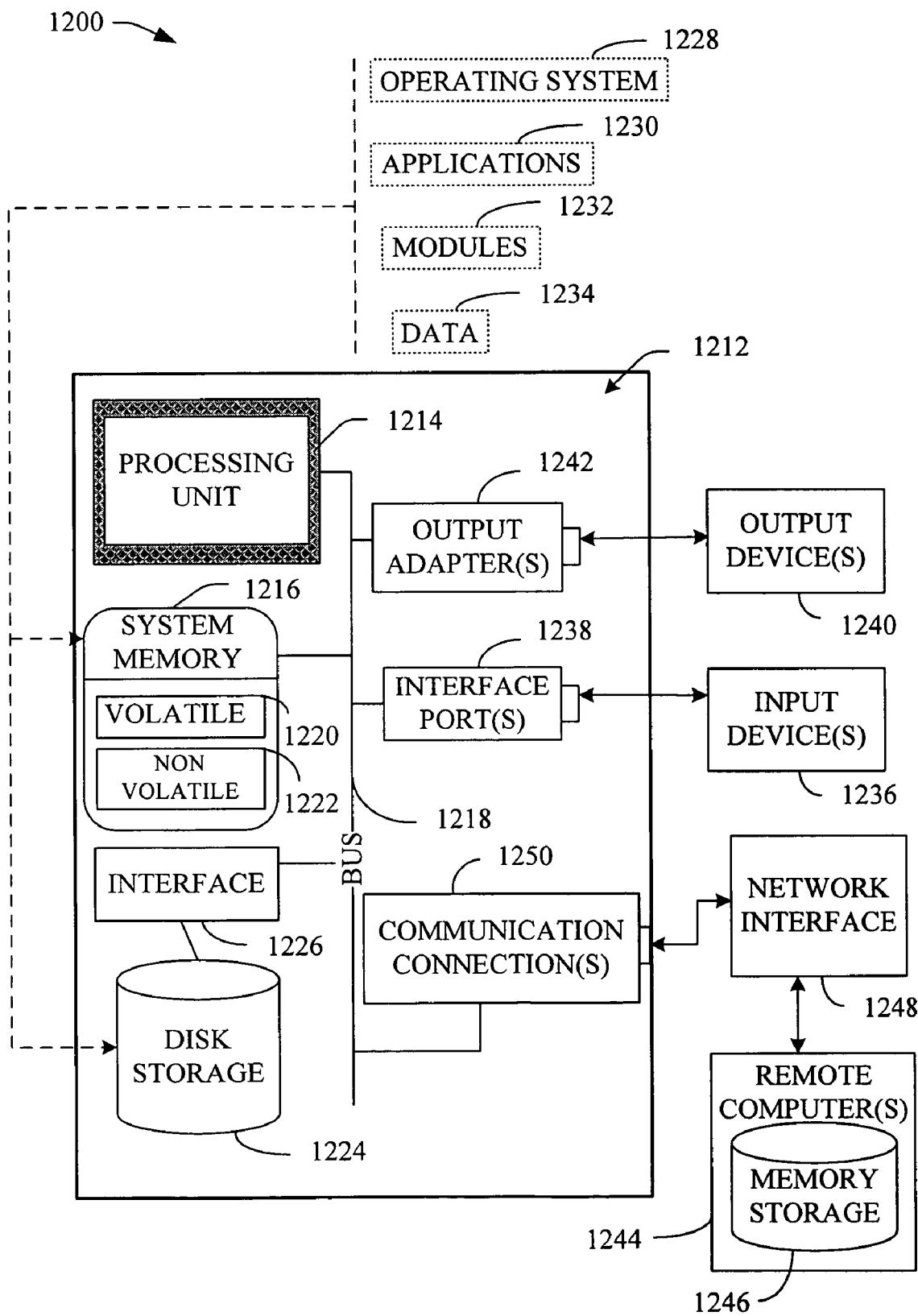
FIG. 12 illustrates an exemplary operating environment that can be employed in accordance with the subject invention.

In order to provide additional context for implementing various aspects of the subject invention, FIGS. 11-12 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on a computer readable storage medium that facilitates providing uniformity between disparate file systems, comprising:

an interface that receives data related to a first file from a first file system and data related to a second file from a second file system, wherein the first and second file systems are different types of file systems from each other, and the second file is a disparate representation of the first file; and a file system adapter that provides uniformity between the first file system and the second file system by employing a file-backed item that is enriched by the received data from the first and second file systems to provide at least one of a property to an item and a file stream associated with the item to allow manipulation of the first file and second file by at least one of an API for the first file system or an API for the second file system.

2. The system of claim 1, the first file system is at least one of a 16 bit file system and a 32 bit file system that utilizes a file and a directory with an associated file stream to provide more structure in space for an application.

3. The system of claim 1, the second file system is a file storage system that defines at least one of an item, a sub-item, a property, and a relationship to represent information as a complex type.

4. The system of claim 1, further comprising an analyzer component that analyzes the first file system to determine at least one of a directory, a file, a file stream, an attribute, a node, a leaf node, and a security characteristic.

5. The system of claim 1, further comprising generator component that creates at least one of the file-backed item for a leaf node of the first file system or the item for a non-leaf node within a directory of the first file system.

6. The system of claim 1, further comprising an attribute component that associates an attribute of the first file within the first file system to the file-backed item, wherein the attribute is to be utilized by the second file system.

7. The system of claim 6, the attribute is a bit that can represent at least one of the following: a read only, a compressed file, or an archived file.

8. The system of claim 1, further comprising a metadata handler component that synchronizes at least one field between the file-backed item and the first file that is within the first file system.

9. The system of claim 8, the metadata handler provides at least one of the following:
a promotion of a new value to an appropriate field in the file-backed item and within the second file in the second file system when a property is modified in the first file in the first file system; or
a demotion of a new value to an appropriate field in the file-backed item and to the first file in the first file system when a property is changed in the file in the second file system.

10. The system of claim 1, further comprising a ghost component that provides at least one of the following:
a ghosting operation that creates a ghosted item that is a replica of the file-backed item but does not contain a file stream or an unghosting operation that converts the ghosted item into the file backed item.

11. The system of claim 1, further comprising an attribute tunneling component that provides synchronization of at least one file-backed item by allowing a swap of the file stream associated thereto.

12. The system of claim 11, the file stream is in a file stream table, wherein the item ID's can be swapped.

13. The system of claim 1, the file-backed item contains at least one of the following: a semantic layer; a file stream; a file attribute; an entity state; a change units; or an item data.

14. The system of claim 1, further comprising a directed acyclic graph (DAG) component that provides a graph of connected items without a cycle.

15. A computer-implemented method that facilitates providing uniformity between disparate file systems, comprising:
analyzing a first file system that utilizes a file and a directory with an associated file stream to provide more structure in space for an application;
generating a file-backed item that is enriched by the file to provide at least one of a property to an item and a file stream associated with the item;
utilizing the file-backed item to provide the application with uniformity of file access between the first file system and a second file system, wherein the first and second file systems are different types of file systems from each other.

16. The method of claim 15, further comprising at least one of the following:
creating an item for a non-leaf node within the first file system;
generating the file-backed item for a leaf node within the first file system;
incorporating an attribute from the file in the file-backed item; or
allowing manipulation by at least one of an API for the first file system and an API for the second file system.

17. The method of claim 15, further comprising at least one of the following:
providing at least one of a ghosting and an unghosting;
utilizing attribute tunneling; or
utilizing a directed acyclic graph of connected items without a cycle.

18. A system embodied on a computer readable medium that facilitates providing uniformity between disparate file systems, comprising:
means for receiving data related to a first file from a first file system and data related to a second file from a second file system, wherein the first and second file systems are different types of file systems from each other, and the second file is a disparate representation of the first file; and
means for providing uniformity between the first file system and the second file system by employing a file-backed item that is enriched by the received data from the first and second file systems to provide at least one of a property to an item and a file stream associated with the item to allow manipulation of the first file and second file by at least one of an API for the first file system or an API for the second file system.

* * * * *